US012087468B2

(12) United States Patent
Hochstöger et al.

(10) Patent No.: US 12,087,468 B2
(45) Date of Patent: Sep. 10, 2024

(54) INSULATED ELECTRIC CONDUCTOR

(71) Applicant: hpw Metallwerk GmbH, Linz (AT)

(72) Inventors: Jürgen Hochstöger, St. Valentin (AT); Rudolf Schrayvogel, St. Leonhard am Forst (AT); Ewald Koppensteiner, St. Florian (AT)

(73) Assignee: hpw Metallwerk GmbH, Linz (AT)

( * ) Notice: Subject to any disclaimer, the term of this patent is extended or adjusted under 35 U.S.C. 154(b) by 0 days.

(21) Appl. No.: 17/932,974

(22) Filed: Sep. 16, 2022

(65) Prior Publication Data

US 2023/0040706 A1 Feb. 9, 2023

Related U.S. Application Data

(63) Continuation of application No. 16/089,270, filed as application No. PCT/EP2017/056489 on Mar. 20, 2017, now abandoned.

(30) Foreign Application Priority Data

Apr. 1, 2016 (EP) .................................... 16163536

(51) Int. Cl.

| | |
|---|---|
| ***H01B 13/14*** | (2006.01) |
| ***H01B 3/30*** | (2006.01) |
| ***H01B 3/42*** | (2006.01) |
| ***H01B 7/02*** | (2006.01) |
| ***H01B 13/00*** | (2006.01) |
| *H01B 3/44* | (2006.01) |

(52) U.S. Cl.

CPC ........... *H01B 13/141* (2013.01); *H01B 3/301* (2013.01); *H01B 3/307* (2013.01); *H01B 3/427* (2013.01); *H01B 7/0216* (2013.01); *H01B 7/0275* (2013.01); *H01B 13/003* (2013.01); *H01B 13/145* (2013.01); *H01B 3/305* (2013.01); *H01B 3/306* (2013.01); *H01B 3/441* (2013.01)

(58) Field of Classification Search

USPC ...................................................... 174/120 C

See application file for complete search history.

(56) References Cited

U.S. PATENT DOCUMENTS

| | | | |
|---|---|---|---|
| 5,396,104 | A | 3/1995 | Kimura |
| 2007/0111528 | A1 | 5/2007 | Sasaki et al. |

(Continued)

FOREIGN PATENT DOCUMENTS

| | | | |
|---|---|---|---|
| CN | 101640082 | A | 2/2010 |
| DE | 102010002721 | A1 | 11/2011 |

(Continued)

OTHER PUBLICATIONS

Konarski, P., et al.; "Cold plasma cleaning of copper and aluminum tested by SIMS depth profile analysis"; SIMS Proceedings Papers; Surface and Interface Analysis, vol. 43, Issue 1-2, Jun. 2, 2010; 6 Pages.

(Continued)

*Primary Examiner* — Tremesha S Willis

(57) ABSTRACT

An insulated electric conductor includes a flat or round wire made of one or more electrically conductive materials, the flat or round wire having an exterior surface that is free of an oxide layer; and an insulating layer adhering directly to the oxide-layer-free exterior surface to form a coating around the oxide-layer-free exterior surface, the insulating layer being made of at least one thermoplastic material which provides electrical insulation. The flat or round wire is designed to conduct an electrical current.

22 Claims, 2 Drawing Sheets

(56) References Cited

U.S. PATENT DOCUMENTS

| | | | |
|---|---|---|---|
| 2007/0169857 | A1 | 7/2007 | Jeong et al. |
| 2007/0251602 | A1 | 11/2007 | Gagnon et al. |
| 2008/0060832 | A1 | 3/2008 | Razavi |
| 2015/0243410 | A1 | 8/2015 | Knerr et al. |
| 2015/0300575 | A1 | 10/2015 | Lowenthal et al. |

FOREIGN PATENT DOCUMENTS

| | | | |
|---|---|---|---|
| EP | 0188369 | A2 | 7/1986 |
| EP | 1498910 | A2 | 1/2005 |
| EP | 3226258 | A1 | 10/2017 |
| JP | 03222210 | A | 10/1991 |
| JP | 2003031061 | A | 1/2003 |
| JP | 2004127649 | A | 4/2004 |
| JP | 2015095363 | A | 5/2015 |
| JP | 2016039103 | A | 3/2016 |
| WO | 2016039350 | A1 | 3/2016 |

OTHER PUBLICATIONS

International Search Report and Written Opinion; Application No. PCT/EP2017/056489; Completed: May 26, 2017; Mailing Date: Jun. 22, 2017; 11 Pages.

Korean Office Action: Application No. 10-2018-7028338; Completed: Aug. 30, 2021; 8 Pages.

INSULATED ELECTRIC CONDUCTOR

FIELD OF THE INVENTION

The invention relates to an insulated electric conductor comprising an electric conductor, preferably of copper or aluminum, having an insulating coating, wherein the insulating coating comprises at least one outer insulating layer made of thermoplastic material, and to a method for producing such an insulated electric conductor.

DESCRIPTION OF THE PRIOR ART

Insulated electric conductors are installed in almost any electrical device to conduct electrical current without causing short circuits that may be caused by the contact of non-electrically insulated conductors. Such insulated electric conductors comprise a copper electric conductor and a coating electrically insulating the electric conductor, which usually comprises one or more layers. In order to ensure the insulation of the electric conductor, the insulating coating comprises an insulating layer of thermoplastic material (also called thermoplastic resin, thermoplastic synthetic material or thermoplastic polymer).

While it is advantageous in many applications that the adhesion of the insulating coating to the electric conductor is weak to allow easy stripping of the electric conductor, it is desirable in other applications to ensure the greatest possible adhesion. Such applications can be found for example in electrical engineering and in particular in electric motors or transformers, where the insulated electric conductors are also exposed to an elevated temperature. The processability of the insulated electric conductors often requires increased adhesion of the insulating coating to the electric conductor, in some cases even at high operating temperatures.

In order to check the adhesion, a round cut is usually carried out on the insulated electric conductor perpendicular to a conductor axis, the electric conductor is stretched by 20% and then the detachment of the insulating coating from the electric conductor is measured. The lower the detachment of the insulating coating from the electric conductor, the better the adhesion.

In conventional insulated electric conductors having an insulating coating with an insulating layer which is preferably highly temperature-resistant, the adhesion between the electric conductor, in particular made of copper, and the insulating coating, in particular the insulating layer, is rather low, since the adhesion of a plastic to the electric conductor is low due to the surface properties.

OBJECT OF THE INVENTION

It is therefore an object of the invention to propose an insulated electric conductor which overcomes the disadvantages of the prior art and ensures good adhesion between the insulating coating and the electric conductor.

SUMMARY OF THE INVENTION

The electric conductor of generic insulated electric conductors consists of copper or an alloy with a high copper content or aluminum or other electrically conductive materials. The electric conductor is understood to mean both a single conductor and a strand containing several individual conductors. The cross-sectional geometry of the electric conductor, which is normal to a conductor axis, can have any geometric shape: square, rectangular, circular or elliptical, wherein it is customary to round off any edges, or they are profiled. The insulation of the electric conductor is ensured by the at least one provided insulating layer of thermoplastic material (also called thermoplastic resin, thermoplastic synthetic material or thermoplastic polymer), wherein the at least one insulating layer can advantageously form the outermost layer of the insulating coating. However, it is also conceivable for one or more additional insulating layers to be applied to the at least one insulating layer.

By contact with oxygen which is unavoidable if the electric conductor is exposed to the atmosphere, an oxide layer, e.g. copper oxide or aluminum oxide, forms on the surface of the electric conductor. Extensive series of experiments have shown that the oxide layer has a negative effect on the adhesion properties of a layer of the insulating coating applied to the surface of the electric conductor.

However, when the oxide layer is removed, the adhesion of the layer of the insulating coating applied to the surface of the electric conductor removed from the oxide layer is significantly improved. It has been shown that the oxide layer can be completely removed by a plasma treatment under an (oxygen-free) protective gas atmosphere, wherein other impurities can be removed by the plasma treatment. It is even possible that the top atomic layers of the electric conductor are removed by the plasma treatment.

In the plasma treatment, a gas plasma is generated in the protective gas atmosphere and the electric conductor in the plasma is bombarded with ions of the protective gas in order to remove at least the oxide layer by the ion bombardment. For example, nitrogen, argon or hydrogen is suitable as a protective gas or process gas. The plasma treatment has in addition to the removal of the oxide layer further positive effects on the insulated electric conductor: on the one hand, the electric conductor is heated by the impact energy of the ions on the surface and can be annealed during the plasma treatment to recrystallize the structure of the electric conductor; on the other hand, the ion bombardment increases the surface energy of the electric conductor, which additionally improves the adhesion of the insulating coating to the surface of the electric conductor. In this context, this is also referred to as an activation of the surface of the electric conductor. Another effect of the plasma treatment is to increase the micro-roughness of the surface of the electric conductor, which also has a positive effect on the adhesion of the insulating coating.

In order to prevent the reformation of an oxide layer on the surface of the electric conductor, at least part of the insulating coating is applied to the surface of the electric conductor under a protective gas atmosphere, preferably under the same protective gas atmosphere under which the plasma treatment is carried out.

In order to achieve the object set out above, it is therefore provided according to the invention that the insulated electric conductor comprises an electric conductor, preferably of copper or aluminum, with an insulating coating, wherein the insulating coating either comprises at least one insulating layer made of thermoplastic material, or at least one insulating layer made of thermoplastic material and a plastic-containing intermediate layer, preferably a plasma polymer layer or at least one fluoropolymer layer, obtainable by a method in which the electric conductor is placed under a protective gas atmosphere and is bombarded with ions of the protective gas in a gas plasma in order to remove an oxide layer formed on a surface of the electric conductor and/or to increase the surface energy of the electric conductor, and subsequently either the at least one insulating layer is applied directly to the surface of the electric conductor under protective gas atmosphere or, in the case that the coating comprises the plastic-containing intermediate layer, at least the plastic-containing intermediate layer of the insulating coating is applied directly under protective gas atmosphere to the surface of the electric conductor.

An insulated electric conductor according to the invention has particularly good adhesion properties by the direct application of a plastic-containing intermediate layer of the insulating coating or by the direct application of the insulating layer of thermoplastic material on the plasma-treated and thus oxide-layer-free surface of the electric conductor: If a circular cut is performed around the insulated electric conductor perpendicular to a conductor axis and the conductor is stretched by 20%, the detachment of the insulating coating from the electric conductor measured in the direction of the conductor axis is only at most 3 mm, preferably at most 2 mm, in particular at most 1 mm.

The adhesion effect is thus achieved in both variants in that a plastic layer, which preferably consists of plastic, is applied directly under protective gas atmosphere on the plasma-cleaned and thus oxide layer-free surface of the electric conductor. On the one hand, the plastic layer may directly be the at least one insulating layer made of thermoplastic material if no intermediate layer is provided. On the other hand, the plastic layer can also be a plastic-containing intermediate layer, preferably a plasma polymer layer or at least one fluoropolymer layer. If the insulating coating has a plastic-containing intermediate layer, the at least one insulating layer is preferably applied directly to the plastic-containing intermediate layer. However, it is also conceivable that one or more further intermediate layers are provided between the plastic-containing intermediate layer and the at least one insulating layer.

Although a plurality of different plastics is conceivable which are suitable as material for the plastic-containing intermediate layer of the insulating coating, the plastic-containing intermediate layer of the insulating coating is preferably the plasma polymer layer or the at least one fluoropolymer layer.

If no plastic-containing intermediate layer is provided and the insulating layer is applied directly to the surface of the electric conductor, it is particularly preferred if the insulating coating consists of the at least one insulating layer, i.e. it has no further intermediate layers.

Surprisingly, it has been found in the context of test series that the detachment of the insulating coating from the electric conductor usually remains far below 1 mm, in particular at most 0.2 mm, preferably at most 0.1 mm, more preferably at most 0.05 mm, particularly preferably at most 0.01 mm, when the at least one insulating layer is applied directly to the surface of the electric conductor. Particularly advantageous effects can be achieved in that the at least one insulating layer comprises a polyaryletherketone [PAEK], in particular polyetheretherketone [PEEK], or consists of polyaryletherketone [PAEK], in particular polyetheretherketone [PEEK].

The same effects of the invention can be achieved in an insulated electric conductor comprising an electric conductor, preferably made of copper or aluminum, having an insulating coating, wherein the insulating coating either comprises at least one insulating layer made of thermoplastic material, or at least one insulating layer made of thermoplastic material and a plastic-containing intermediate layer, preferably a plasma polymer layer or at least one fluoropolymer layer, in such a way that an oxide layer formed on a surface of the electric conductor is removed, preferably by bombardment of the electric conductor with ions of a protective gas of a protective gas atmosphere in a gas plasma, and subsequently either the at least one insulating layer is applied directly to the oxide-layer-free surface of the electric conductor or, in the case that the coating comprises the plastic-containing intermediate layer, at least the plastic-containing intermediate layer of the insulating coating is applied directly to the oxide-free surface of the electric conductor.

An embodiment variant of the invention provides that the electric conductor is arranged continuously under a protective gas atmosphere until the application of the insulating coating in order to prevent the formation of a new oxide layer on the surface of the electric conductor. It is also possible to pass through several protective gas atmospheres in succession, as long as the plasma-treated electric conductor is arranged uninterruptedly under one of the inert gas atmospheres.

In a further embodiment variant of the invention, it is provided that the gas plasma for bombarding the electric conductor concerns a low-pressure plasma, preferably having a pressure below 80 mbar, which can be produced in a manner known per se. For example, pressures below 50 mbar or even below 20 mbar are conceivable.

In order to enable the use of the insulated electric conductor in an environment with elevated temperature, for example in electrical machines with increased operating temperature, it is provided in a further embodiment variant of the invention that the insulating coating, in particular the at least one insulating layer, has a temperature resistance of at least 180° C., preferably of at least 200° C., in particular of at least 220° C.

Particularly good properties in terms of temperature resistance and resistance to a variety of organic and chemical solvents, in particular also against hydrolysis, are achieved in a preferred embodiment of the insulated electric conductor according to the invention and the method according to the invention in that the thermoplastic material of the at least one insulating layer is selected from the group consisting of polyaryletherketone [PAEK], polyimide [PI], polyamideimide [PAI], polyetherimide [PEI], polyphenylene sulfide [PPS], and combinations thereof. It is understood that the thermoplastic material may comprise one or more of the above-mentioned plastics and optionally further constituents, such as fiber material, fillers or other plastics.

Polyaryletherketones are composed phenyl groups linked by means of oxygen bridges, i.e. ether or ketone groups, wherein the number and sequence of ether or ketone groups within the polyaryletherketones is variable. Polyimides are plastics whose most important structural feature is the imide group. These include polysuccinimide (PSI), polybismaleimide (PBMI) and polyoxadiazobenzimidazole (PBO), polyimide sulfone (PISO) and polymethacrylimide (PMI).

Accordingly, in a particularly preferred embodiment variant of the insulated electric conductor according to the invention and the method according to the invention, it is provided that the thermoplastic material of the at least one insulating layer is a polyaryletherketone [PAEK] selected from the group consisting of polyetherketone [PEK], polyetheretherketone [PEEK], polyetherketoneketone [PEKK], polyetheretherketoneketone [PEEKK], polyetherketoneetherketoneketone [PEKEKK], and combinations thereof. Polyetheretherketone [PEEK] has proven to be particularly suitable for the at least one insulating layer.

In a further embodiment variant of the invention, it is provided that the at least one insulating layer has a thickness between 10 and 1000 μm, preferably between 25 μm and 750 μm, particularly preferably between 30 μm and 500 μm, in particular between 50 μm and 250 μm. It is understood that other layer thicknesses are conceivable, for example 40 μm, 60 μm, 80 μm, 100 μm or 200 μm, to name a few possibilities. It is understood that the stated values can relate both to the thickness of a single layer of the insulating layer and also to the total thickness of the insulating layer if the insulating layer comprises more than one layer.

The at least one insulating layer can be produced cheaply and quickly if it is applied by an extrusion process, i.e. it is extrusion-coated. Therefore, in a further preferred embodiment variant of the invention, it is provided that the, preferably outer, insulating layer can be produced by means of an extrusion method.

If the insulating coating consists of the at least one insulating layer and the at least one insulating layer is applied directly to the surface of the electric conductor, a particularly simple and cost-effective production of an insulated electric conductor according to the invention is made possible because the adhesion of the at least one insulating layer to the surface of the electric conductor by the plasma treatment is already so good that no intermediate layers are necessary.

Therefore, in a further particularly preferred embodiment variant of the invention, it is provided that the insulating coating consists of the at least one insulating layer and that the intermediate layer which is directly applied to the surface of the electric conductor and contains the plastic is the at least one insulating layer.

Thus, the particularly preferred embodiment relates to an insulated electric conductor comprising an electric conductor, preferably made of copper or aluminum, having an insulating coating, wherein the insulating coating consists of at least one insulating layer of thermoplastic material, obtainable by a method in which the electric conductor is placed under a protective gas atmosphere and is bombarded with ions of the protective gas in a gas plasma to remove an oxide layer formed on a surface of the electric conductor and/or to increase the surface energy of the electric conductor, and the at least one insulating layer is applied directly to the surface of the electric conductor, the at least one insulating layer is applied to the electric conductor under protective gas atmosphere.

In the same way, the particularly preferred embodiment also relates to an insulated electric conductor comprising an electric conductor, preferably made of copper or aluminum, having an insulating coating, wherein the insulating coating consists of at least one insulating layer of thermoplastic material, wherein according to the invention it is provided that an oxide layer formed on a surface of the electric conductor is removed by bombardment of the electric conductor with ions of a protective gas of a protective gas atmosphere in a gas plasma and subsequently the at least one insulating layer is applied directly to the oxide-layer-free surface of the electric conductor.

The insulating coating may, for example, only consist of a single insulating layer, which is applied directly to the surface of the electric conductor in order to allow a particularly simple production.

However, in order to drastically reduce the likelihood of a defect in the insulating coating, for example a section of the electric conductor not provided with the insulating coating due to an error in the production process of an insulating layer, it is provided in a further particularly preferred embodiment of the invention that the insulating coating consists of exactly two or more than two, for example, three or four, insulating layers. In this case, a lowermost insulating layer is applied directly to the surface of the electric conductor, wherein the further insulating layers are respectively applied to one of the preceding insulating layers. If a defect has occurred in the lowermost insulating layer, i.e. if a section of the electric conductor is not covered by the lowermost insulating layer, then the probability that precisely the defective section of the lowermost insulating layer will not be covered by the subsequent insulating layers will be reduced following an exponential function. The higher the number of insulating layers, the lower the probability that a portion of the electric conductor has no insulating coating. In order to achieve the improved adhesion of the subsequent insulating layers to the electric conductor, all insulating layers are applied under a protective gas atmosphere, so that the adhesion of subsequent insulating layers is ensured in the region of defective sections of the preceding insulating layers.

In principle, at least one, for example one, two, three or four, further insulating layer of thermoplastic material can be applied to the insulating coating or to the insulating coating consisting of the at least one insulating layer. The at least one further insulating layer is preferably constructed analogously to the at least one insulating layer, so that the thermoplastic material of the at least one further insulating layer is selected from the group consisting of polyaryletherketone [PAEK], in particular polyetheretherketone [PEEK], polyimide [PI], polyamideimide [PAI], Polyetherimide [PEI], polyphenylene sulfide [PPS], and combinations thereof.

s Since the defective sections of the at least one insulating layer are generally relatively small areas, it is also conceivable for at least one further insulating layer to be applied outside the protective gas atmosphere to the insulating coating in order to cover any defective sections of the insulating coating in the region of the defective portions of the insulating coating, so that the adhesion of the further insulating layer is not improved in the region of the defective portions of the insulating coating. It is understood that other insulating layers can be applied, if a greater thickness of the insulation is required. Therefore, in a further embodiment variant of the invention, it is provided that at least one further insulating layer, preferably one, two or three thereof, is applied to the insulating coating, wherein the at least one further insulating layer is not applied under a protective gas atmosphere.

In a first alternative embodiment variant of the invention, in order to improve the adhesion of the insulating coating to the surface of the electric conductor, it is provided that the insulating coating has a plasma polymer layer of cross-linked macromolecules of non-uniform chain length applied directly to the surface of the electric conductor, which plasma polymer layer can be produced by polymerization of a gaseous monomer in a gas plasma, preferably in the gas plasma for bombarding the electric conductor. In other words, the intermediate layer of the insulating coating which is applied directly to the surface of the electric conductor and contains plastic is the plasma polymer layer in this exemplary embodiment. The plasma polymer layer serves as an intermediate layer and, on the one hand, adheres excellently to the surface of the electric conductor and, on the other hand, enables increased adhesion of the layer of the insulating coating, for example the at least one insulating layer, that is applied to the plasma polymer layer.

A further embodiment variant of the first alternative embodiment provides that the plasma polymer layer has a thickness of 1 μm or less. Thicknesses of up to one hundredth of a micrometer are conceivable as the lower limit. Due to the small layer thickness, the plasma polymer layer has an insignificant effect on the entire thickness of the insulated electric conductor.

According to a further embodiment variant of the first alternative embodiment variant, the monomer for producing the plasma polymer layer is ethylene, buthenol, acetone or tetrafluoromethane [$CF_4$]. The plasma polymer layers formed by these monomers in the plasma are distinguished by particularly good adhesion properties. In particular, if the plasma polymer layer should have similar properties as polytetrafluoroethylene [PTFE] or perfluoroethylene propylene [FEP], $CF_4$ is suitable as a monomer.

In a second alternative embodiment, it is provided that the insulating coating has at least one fluoropolymer layer, applied directly to the surface of the electric conductor, preferably comprising polytetrafluoroethylene [PTFE] or perfluoroethylene propylene [FEP]. The fluoropolymer layer is also distinguished by excellent adhesion properties, both on the electric conductor and on the layer applied to the fluoropolymer layer, and serves as an intermediate layer of the insulating coating. It is also conceivable that several fluoropolymer layers, for example two, three or four, are applied one above the other to the electric conductor. Particularly advantageous adhesion properties are achieved in that the thickness of the at least one fluoropolymer layer is between 1 μm and 120 μm, preferably between 5 μm and 100 μm, particularly preferably between 10 μm and 80 μm, in particular between 20 μm and 50 μm.

In order to achieve the above-described improved adhesion properties for layers of the insulating coating applied to the plasma polymer layer or the at least one fluoropolymer layer, in particular for the at least one insulating layer, on the electric conductor, so that the adhesion of subsequent layers in the region of defective sections of the preceding layers applied to the electric conductor is increased, the entire insulating coating is applied in a preferred embodiment of the invention under a protective gas atmosphere.

In order to reduce the number of different layers in the insulating coating and to keep the associated production costs low, it is provided in a further embodiment of the invention that the at least one insulating layer is applied directly to the plasma polymer layer or the at least one fluoropolymer layer. In other words, the insulating coating consists of at least two layers: the first lower layer applied directly to the electric conductor according to the first or second alternative embodiment variant and the second upper layer in the form of at least one insulating layer of thermoplastic material. The outermost layer of the insulating coating can be formed either by the at least one insulating layer itself or by one or more further layers.

The invention further relates to a method for producing an insulated electric conductor, which has the following method steps:

bombarding an electric conductor placed under a protective gas, preferably made of copper or aluminum, with ions of the protective gas in a gas plasma, preferably a low-pressure plasma, to remove an oxide layer formed on the surface of the electric conductor and/or to increase the surface energy of the electric conductor;

applying an insulating coating to the surface of the electric conductor, wherein the insulating coating either comprises at least one insulating layer made of thermoplastic material, or at least one insulating layer made of thermoplastic material and a plastic-containing intermediate layer, preferably a plasma polymer layer or at least one fluoropolymer layer, wherein either the at least one insulating layer is applied directly to the surface of the electric conductor under protective gas atmosphere or, in the case that the coating comprises the plastic-containing intermediate layer, at least the plastic-containing intermediate layer of the insulating coating is applied directly under protective gas atmosphere to the surface of the electric conductor.

The electric conductor, preferably made of copper or aluminum, is subjected to the method in the form of a band or a wire. In this case, the electric conductor is treated either "in-line", i.e. directly after the production of the electric conductor (such as by cold forming or extrusion), according to the method according to the invention, or the electric conductor is provided in a wound-up form via a coil outlet. As a rule, the electric conductor is subjected to a mechanical and/or chemical pre-cleaning before the plasma treatment. The plasma treatment is carried out analogously to the previous embodiments, wherein the electric conductor is continuously conveyed through the plasma treatment unit performing the plasma treatment. By suitable choice of the process parameters, the thickness of the layer removed by the plasma treatment from the electric conductor can be adjusted precisely. In addition, it is also possible to define the temperature for the soft annealing and the associated recrystallization of the microstructure of the electric conductor.

After the plasma treatment, i.e. the removal of the oxide layer and any impurities from the surface of the electric conductor, wherein even thin layers (less than 1 μm, preferably less than 0.1 μm) of the surface of the electric conductor itself can be removed by bombardment with ions in the gas plasma or the activation of the surface of the electric conductor, the insulating coating is applied to the treated surface of the electric conductor. The insulating coating adheres particularly well to the surface of the electric conductor due to the removal of the oxide layer or by the activation of the surface by increasing the surface energy of the electric conductor. In order to prevent the formation of a new oxide layer on the surface of the electric conductor, which would prevent or at least significantly weaken the effect according to the invention, either the at least one insulating layer or at least the plastic-containing intermediate layer of the insulating coating, i.e. in particular the plasma polymer layer or at least one fluoropolymer layer, is applied under protective gas atmosphere directly to the oxide layer-free surface of the electric conductor. In particular, it is advantageous if the electric conductor is arranged continuously under a protective gas atmosphere until the application of the insulating coating. It goes without saying that, provided that two, three or more insulating layers of thermoplastic material are provided, at least the first of the insulating layers is applied directly to the surface of the electric conductor and the subsequent insulating layers are at least partially applied to the underlying insulating layers.

3 mm2 mm1 mmInsulated electric conductors produced in this manner show particularly good adhesion properties as a result of the direct application of a plastic-containing intermediate layer of the insulating coating or by the direct application of at least one insulating layer of thermoplastic material on the plasma-treated, oxide-free surface of the electric conductor: If a circular cut is carried out perpendicular to a conductor axis on the insulated electric conductor and the conductor is stretched by 20%, the detachment of the insulating coating from the electric conductor measured in the direction of the conductor axis is only at most, preferably at most, in particular at most.

3 mm2 mm1 mm

If the at least one insulating layer of thermoplastic material is applied directly to the surface of the electric conductor, it has been found that the detachment of the insulating coating from the electric conductor usually remains far below 1 mm, in particular not more than 0.2 mm, preferably not more than 0.1 mm, more preferably not more than 0.05 mm, particularly preferably not more than 0.01 mm. Particularly advantageous effects are achieved when the thermoplastic material of the at least one insulating layer is selected from the group consisting of polyaryletherketone [PAEK], in particular polyetheretherketone [PEEK], polyimide [PI], polyamideimide [PAI], polyetherimide [PEI], polyphenylene sulfide [PPS] and combinations thereof.

A variant of the method provides that the at least one insulating layer is extrusion-coated. Extrusion is a cost-effective method for applying the insulating layer and is particularly also suitable for PAEK, in particular PEEK, and PPS. The at least one insulating layer can thus also be applied in a simple manner as the outermost layer of the insulating coating.

By preheating the electric conductor, which is particularly advantageous when the at least one insulating layer or the insulating coating is extruded directly onto the surface of the electric conductor, a sudden cooling of the plastic-containing intermediate layer is reduced in contact with the electric conductor and thus negative influences on the adhesion minimized. Likewise, it can be provided that the electric conductor is cooled before applying the insulating coating in order to prevent excessive heating, such as a melt, of the plastic-containing intermediate layer in contact with the electric conductor. Therefore, it is provided in a further preferred embodiment variant of the method according to the invention that the electric conductor is brought to a temperature of at least 200° C., preferably at least 400° C., prior to the application of the insulating coating.

In a further embodiment variant of the invention, it is provided that after the at least one insulating layer has been extrusion-coated, the insulated electric conductor is cooled depending on the strength of the at least one insulating layer to be achieved. The adjustment of the mechanical properties of the at least one insulating layer, in particular the mechanical strength, takes place, inter alia, by the defined cooling of the insulated electric conductor and the consequent adjustment of the degree of crystallization, and is particularly important if the at least one insulating layer is the outermost layer the insulating coating. If, for example, the insulated electric conductor is cooled slowly, for example by cooling in the air, a high degree of crystallinity of the at least one insulating layer is achieved. It is also conceivable to provide quenching in a water bath, therefore an abrupt cooling, or a combination of abrupt and slow cooling.

In order to further improve the adhesion of the insulating coating to the electric conductor, in particular if the at least one insulating layer is applied directly to the surface of the electric conductor, it is provided in a preferred embodiment of the method according to the invention that the insulated electric conductor, after extruding the at least one insulating layer onto the surface, is guided via rollers, preferably pressure rollers. It is particularly advantageous in this case if the at least one insulating layer forms the outermost layer of the insulating coating. Tight guiding of the insulated electric conductor via the pressure rollers under pressure of the insulated electric conductor leads to a particularly good adhesion of the insulating coating or in particular of the at least one insulating layer on the surface of the electric conductor. In this case, the boundary surfaces of the insulating coating between the individual layers, if several are present, and/or the boundary surfaces of the lowermost layer of the insulating coating and the surface of the electric conductor are pressed together, thus enhancing the adhesion effects.

In a particularly preferred embodiment variant of the invention, which is characterized by particularly good adhesion properties, it is provided that the insulating coating consists of at least one insulating layer and that the at least one insulating layer is applied directly to the surface of the electrical conductor as a plastic-containing intermediate layer of the insulating coating under a protective gas atmosphere. Accordingly, the following method step is carried out:

Applying an insulating coating to the surface of the electric conductor, wherein the insulating coating consists of at least one insulating layer of thermoplastic material and wherein the at least one insulating layer is applied under protective gas atmosphere directly to the surface of the electric conductor.

This also achieves the previously mentioned particularly low detachment of less than 1 mm.

In order, as mentioned above, to drastically reduce the probability of a defect in the insulating coating, it is provided in another embodiment variant that the insulating coating consists of at least two, preferably exactly two, insulating layers and the insulating coating is produced by tandem extrusion under a protective gas atmosphere. Due to the tandem extrusion, the at least two insulating layers are produced independently of one another, so that an obstruction of an extrusion tool only causes a defect in one of the insulating layers. As a result, the defective section is covered by the subsequent extrusion steps with high probability.

If, as stated above, due to the relatively small area of the defects, improved adhesion can be dispensed with or a thicker insulating coating is required, a further embodiment variant of the invention provides that at least one further insulating layer of thermoplastic material is extruded by tandem extrusion onto the insulating coating, wherein the extrusion of the further insulating layer does not take place under a protective gas atmosphere.

Preferably, the thermoplastic material of the at least one further insulating layer is selected from the group consisting of polyaryletherketone [PAEK], in particular polyetheretherketone [PEEK], polyimide [PI], polyamideimide [PAI], polyetherimide [PEI], polyphenylene sulfide [PPS] and combinations thereof.

If the insulating coating comprises at least one fluoropolymer layer, which is applied as a plastic-containing intermediate layer directly to the surface of the electric conductor, the steps required for the production of the insulating coating can be reduced by the fact that the at least one insulating layer and the at least one fluoropolymer layer can be prepared by co-extrusion or tandem extrusion. Thus, both layers can be produced in a single manufacturing step and with an extrusion unit.

In order to improve the adhesion of the insulating coating to the electric conductor, it is provided in a further embodiment that a plasma polymer layer is applied directly to the surface of the electric conductor by polymerization of a gaseous monomer in a gas plasma as a plastic-containing intermediate layer.

Since high temperature resistance and high adhesion of the insulating coating on the electric conductor is important, in particular in electrical engineering, it is provided according to the invention that an insulated electric conductor according to the invention is used as a winding wire for electrical machines, preferably electric motors or transformers.

BRIEF DESCRIPTION OF THE DRAWINGS

The invention will now be explained in more detail below with reference to exemplary embodiments. The drawings are provided by way of example and are intended to explain the concept of the invention, but shall in no way restrict it or even render it conclusively, wherein.

DETAILED DESCRIPTION OF THE PREFERRED EMBODIMENTS

Figure 1:
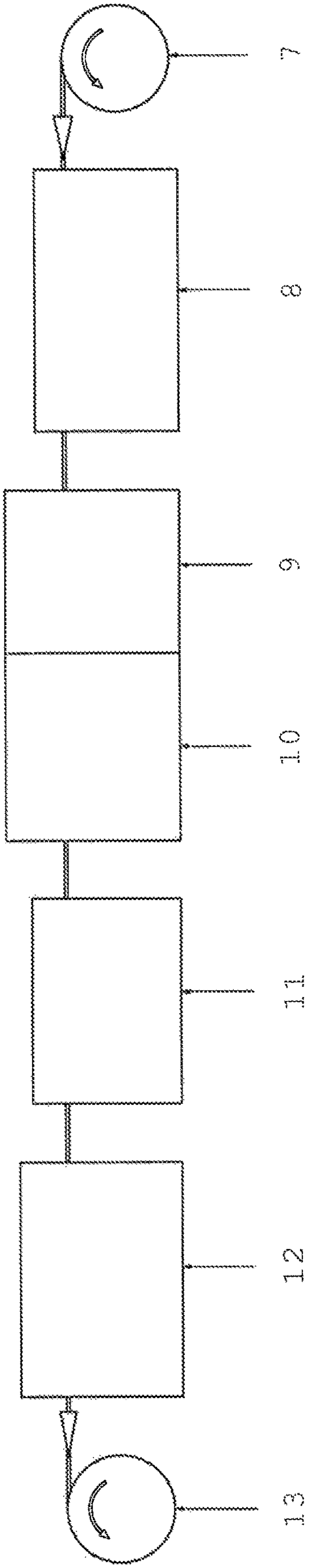
FIG. 1 shows a schematic representation of a method according to the invention.

FIG. 1 shows a schematic representation of a method for producing an insulated electric conductor, as shown in FIGS. 2*a* to 2*d* and 3*a* to 3*d*. The insulated electric conductor comprises an electric conductor 1 made of copper, wherein other materials such as aluminum are conceivable, and an insulating coating 2, which has at least one insulating layer 3 made of thermoplastic material (also called thermoplastic resin, thermoplastic synthetic material or thermoplastic polymer), preferably a high-temperature-resistant plastic. In the following exemplary embodiments, the at least one insulating layer 3 is formed as an outer insulating layer 3 and thus forms the outermost layer of the insulating coating 2. It is understood, however, that in alternative embodiment variants still one or more further layers, preferably insulating layers, may be applied to the insulating layer 3, which can then form the outermost layer of the insulating coating 2.

The electric conductor 1 is continuously supplied in the illustrated embodiment as a band or wire via a coil outlet 7 to the process and can be prepared for example by means of cold forming processes, such as drawing or rolling, or extrusion, for example by means of Conform® technology. It goes without saying that the method according to the invention can also be carried out "in-line", i.e. directly connected to the production process. In a first step, the electric conductor 1 is pre-cleaned mechanically in a pre-cleaning unit 8, for example by means of a grinding process, or chemically, for example by means of suitable solvents or acids, in order to remove coarse soiling from the electric conductor 1.

In the next method step, the pre-cleaned electric conductor 1 enters a plasma treatment unit 9 in which a protective gas atmosphere of nitrogen, argon or hydrogen is present and a gas plasma in the form of a low-pressure plasma is produced with less than 20 mbar pressure. However, a low-pressure plasma can already be produced even at a pressure of less than 80 mbar. In this low-pressure plasma, the surface of the electric conductor 1 is bombarded with ions of the protective gas in order to carry off or remove an oxide layer formed on a surface of the electric conductor 1. At the same time, the electric conductor 1 is soft-annealed by the plasma treatment and the surface energy of the electric conductor 1 therefore increases, thus activating the surface.

By removing the oxide layer and any contaminants from the surface of the electric conductor 1, wherein it may even be provided that very thin layers of the electric conductor 1 itself are removed from the surface, and by the increase of the surface energy, the adhesion between the electric conductor 1 made of copper and the insulating coating 2 applied to the electric conductor 1 can be improved decisively.

Figure 2A:
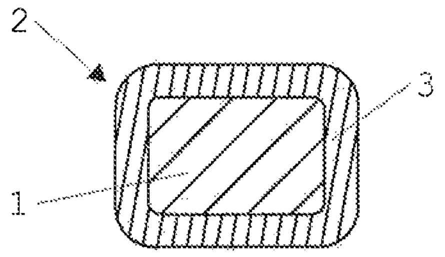
FIG. 2*a* shows a first embodiment variant of an insulated electric conductor with a rectangular cross-section.
Figure 3A:
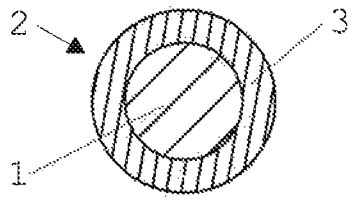
FIGS. 3*a*-3*c* show the first to third embodiment variant with a round cross-section.

In the first embodiment variant of the insulated electric conductor according to the invention, shown in FIG. 2*a* as a flat conductor with a rectangular cross-section and in FIG. 3*a* with a round cross-section, the insulating coating 2 consists only of an insulating layer 3. The insulating layer 3 has a temperature resistance of more than 180° C., preferably above 220° C., so that the insulated electric conductor can be used even at high operating temperatures. The outer insulating layer 3 consists of polyetheretherketone [PEEK], which has both high temperature resistance and high resistance to a large number of organic and inorganic substances. Alternatively, the outer insulating layer 3 may also consist of polyphenylene sulfide [PPS] or comprise PEEK and/or PPS.

In order to achieve the increased adhesion between the electric conductor 1 and the outer insulating layer 3, the electric conductor 1 reaches the extrusion unit 11 after passing through the plasma treatment unit 9, in which the outer insulating layer 3 is extrusion-coated onto the electric conductor 1. In this case, the electric conductor 1 is preheated to a temperature of at least 200° C., preferably at least 300° C. In order to prevent the re-formation of an oxide layer, both the extrusion and the transport of the conductor 1 into the extrusion unit 11 takes place under a protective gas atmosphere. An insulated electric conductor produced in this way can be used, for example, as a winding wire, which is also known in English as a "magnet wire", in an electric machine, such as an electric motor or a transformer. The thickness of the outer insulating layer 3 is about 30 μm in the present exemplary embodiment.

In particular, when the insulating layer 3 consists of a polyaryletherketone [PAEK], such as polyetheretherketone [PEEK], particularly good adhesion properties are achieved. Thus, the detachment of the insulating layer 3 from the electric conductor m 1 usually remains well below 1 mm, and is in particular at most 0.2 mm, preferably at most 0.1 mm, more preferably at most 0.05 mm, particularly preferably at most 0.01 mm. Even if the thermoplastic material of the insulating layer 3 is polyimide [PI], polyamideimide [RAI], polyetherimide [PEI], polyphenylene sulfide [PPS], increased adhesion properties can be achieved.

In general, the at least one insulating layer 3 may also comprise two, three, four or more individual insulating layers 3, all of which are produced under a protective gas atmosphere in the extrusion unit 11. As a result, the probability of defects in the insulating coating 2 can be drastically reduced, since defects in the lowermost of the insulating layers 3 are compensated by subsequent insulating layers 3. Tandem extrusion processes are particularly suitable for such a preparation.

Additionally or instead, it may also be provided that further insulating layers, which are preferably constructed analogously to the at least one insulating layer 3, i.e. in particular of a polyaryletherketone [PAEK] such as polyetheretherketone [PEEK] or another of the aforementioned plastics, are applied to the insulating coating 2 outside the protective gas atmosphere in a further extrusion unit 12.

Figure 2B:
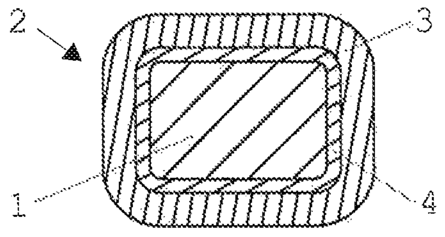
FIG. 2*b* shows a second embodiment variant of an insulated electric conductor with a rectangular cross-section.
Figure 3B:
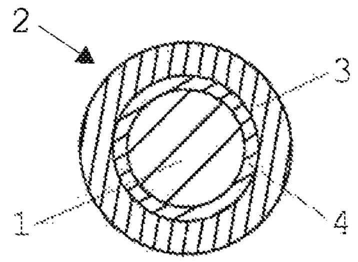

In order to increase the adhesion between the insulating coating 2 and the electric conductor 1 as an alternative to the first embodiment variant, the insulating coating 2 comprises in the second embodiment shown in FIGS. 2*b* and 3*b*, in addition to the outer insulating layer 3 made of PEEK or PPS, a plastic-containing intermediate layer in form of a plasma polymer layer 4. This plasma polymer layer 4 is produced in the method according to the invention in a plasma polymerization unit 10, which is arranged after the plasma treatment unit 9 and before the extrusion unit 11. It is also conceivable that the plasma treatment and the plasma polymerization are carried out in a combined device. In the plasma polymerization unit 10, after the oxide layer is removed and surface energy increased, as above, the plasma polymer layer 4 is formed on the surface of the electric conductor 1 by activating a gaseous monomer such as ethylene, butenol, acetone or tetrafluoromethane [$CF_4$] by the plasma and thereby forming highly cross-linked macromolecules of different chain length and a proportion of free radicals, which deposit as a plasma polymer layer 4 on the surface of the electric conductor 1. In the present exemplary embodiment, the resulting plasma polymer layer 4 is less than 1 μm thick and adheres particularly well to the activated and oxide-free surface of the electric conductor 1.

The outer insulating layer 3 is in turn extruded in the extrusion unit 11 onto the plasma polymer layer 4 as described above, wherein the adhesion between the plasma polymer layer 4 and the outer insulating layer 3 is also high.

Figure 2C:
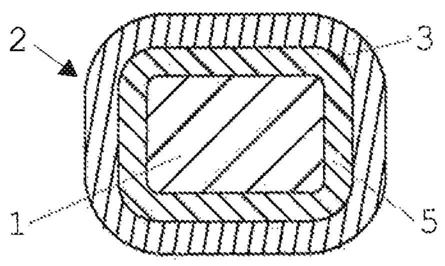
FIG. 2*c* shows a third embodiment variant of an insulated electric conductor with a rectangular cross-section.
Figure 3C:
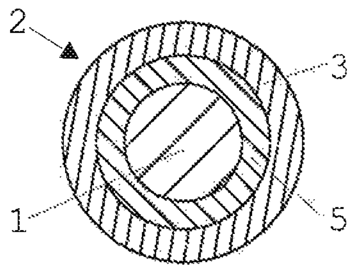

In the third embodiment variant, illustrated in FIGS. 2*c* and 3*c*, the insulating coating 2 comprises, in addition to the outer insulating layer 3 made of PEEK, a plastic-containing intermediate layer formed as a fluoropolymer layer 5 of polytetrafluoroethylene [PTFE] or perfluoroethylene propylene [FEP], which is applied directly to the surface of the electric conductor 1 and further improves the adhesion between the electric conductor 1 and the outer insulating layer 3. The fluoropolymer layer 5 is produced together with the outer insulating layer 3 in the extrusion unit 11 by means of a co-extrusion or tandem extrusion process. The thickness of the fluoropolymer layer 5 is about 30 μm in the present embodiment.

After extrusion-coating the outer insulating layer 3, the insulated electric conductor is cooled in a controlled manner, for example by air cooling, and passed over a series of pressure rollers which further improve adhesion by applying pressure to the insulated electric conductor. Finally, the insulated electric conductor is wound on a coil winder 13.

The illustrated devices in FIG. 1 concern an overview in which all devices are shown, which are necessary for the production of the individual embodiment variants. While the sequence, from right to left, of the devices passed through are independent of the embodiment variant and in any case the plasma treatment unit 9 and the extrusion unit 11 have to be passed, the plasma polymerization unit 9 and the further extrusion unit 12 are optional devices which are used only in the production of specific design variants. It is understood that instead of a co-extrusion or tandem extrusion process, several individual extrusions can be carried out sequentially.

LIST OF REFERENCE NUMERALS

1 Electric conductor
2 Insulating coating
3 Insulating layer
4 Plasma polymer layer
5 Fluoropolymer layer
6 Metal layer
7 Coil outlet
8 Precleaning unit
9 Plasma treatment unit
10 Plasma polymerization unit
11 Extrusion unit
12 Further extrusion unit
13 Coil winder

The invention claimed is:

1. A winding wire for electrical machines, comprising:
a flat or round wire made of one or more electrically conductive materials, the flat or round wire having an exterior surface that is free of an oxide layer; and
an insulating layer adhering directly to the oxide-layer-free exterior surface to form a coating around the oxide-layer-free exterior surface, the insulating layer being made of at least one thermoplastic material which provides electrical insulation;
wherein the flat or round wire is designed to conduct an electrical current.

2. The winding wire according to claim 1, comprising more than one of said flat or round wire arranged in a strand, wherein the insulating layer adheres directly to the oxide-layer-free exterior surface of each flat or round wire to form the coating.

3. The winding wire according to claim 1, wherein the insulating layer adheres directly to the oxide-layer-free exterior surface as a result of application under a protective gas atmosphere.

4. The winding wire according to claim 1, wherein the insulating layer has a thickness between 10 μm and 1000 μm.

5. The winding wire according to claim 1, wherein the insulating layer is an extrusion coated layer on the oxide-layer-free exterior surface.

6. The winding wire according to claim 1, wherein the thermoplastic material is selected from the group consisting of: polyaryletherketone [PAEK], polyimide [PI], polyamideimide [PAI], polyetherimide [PEI], polyphenylene sulfide [PPS], and combinations thereof.

7. The winding wire according to claim 1, wherein the thermoplastic material is a polyaryletherketone [PAEK] selected from the group consisting of: polyetherketone [PEK], polyetheretherketone [PEEK], polyetherketoneketone [PEKK], polyetheretherketoneketone [PEEKK], polyetherketoneetherketoneketone [PEKEKK], and combinations thereof.

8. The winding wire according to claim 1, wherein the one or more electrically conductive materials include copper, aluminum, or a copper alloy.

9. The winding wire according to claim 1, wherein the adhesion between the insulating layer and the oxide-layer-free exterior surface resists detachment such that said detachment, in response to the insulating layer being cut circumferentially in a direction perpendicular to an axis of the flat or round wire and the winding wire being stretched by 20%, is at most 3 mm as measured in a direction of a conductor axis.

10. A winding wire for electrical machines, comprising:

a flat or round wire made of one or more electrically conductive materials, the flat or round wire having an exterior surface that is free of an oxide layer; and an insulating layer adhering directly to the oxide-layer-free exterior surface to form a coating around the oxide-layer-free exterior surface, the insulating layer being made of at least one thermoplastic material which provides electrical insulation;

wherein the insulating layer is applied under a protective gas atmosphere; wherein the flat or round wire is designed to conduct an electrical current;

wherein the insulating layer is an extrusion coated layer on the oxide-layer-free exterior surface.

11. The winding wire according to claim 10, wherein the insulating layer has a thickness between 30 μm and 1000 μm.

12. The winding wire according to claim 10, wherein the thermoplastic material is selected from the group consisting of: polyaryletherketone [PAEK], polyimide [PI], polyamideimide [PAI], polyetherimide [PEI], polyphenylene sulfide [PPS], and combinations thereof.

13. The winding wire according to claim 10, wherein the thermoplastic material is a polyaryletherketone [PAEK] selected from the group consisting of: polyetherketone [PEK], polyetheretherketone [PEEK], polyetherketoneketone [PEKK], polyetheretherketoneketone [PEEKK], polyetherketoneetherketoneketone [PEKEKK], and combinations thereof.

14. The winding wire according to claim 10, wherein the one or more electrically conductive materials include copper, aluminum, or a copper alloy.

15. The winding wire according to claim 10, wherein the adhesion between the insulating layer and the oxide-layer-free exterior surface resists detachment such that said detachment, in response to the insulating layer being cut circumferentially in a direction perpendicular to an axis of the flat or round wire and the winding wire being stretched by 20%, is at most 1 mm as measured in a direction of a conductor axis.

16. An insulated electric conductor, comprising:

a flat or round wire made of one or more electrically conductive materials, the flat or round wire having an exterior surface that is free of an oxide layer; and at least one insulating layer adhering directly to the oxide-layer-free exterior surface to form a coating around the oxide-layer-free exterior surface, the at least one insulating layer being made of at least one thermoplastic material that is selected from the group consisting of: polyaryletherketone [PAEK], polyimide [PI], polyamideimide [PAI], polyetherimide [PEI], polyphenylene sulfide [PPS], and combinations thereof, which at least one thermoplastic material provides electrical insulation;

wherein the flat or round wire is designed to conduct an electrical current;

wherein the adhesion between the insulating layer and the oxide-layer-free exterior surface resists detachment such that said detachment, in response to the insulating layer being cut circumferentially in a direction perpendicular to an axis of the flat or round wire and the insulated electric conductor being stretched by 20%, is at most 3 mm as measured in a direction of a conductor axis.

17. The insulated electric conductor according to claim 16, wherein a total thickness of the at least one insulating layer is between 30 μm and 1000 μm.

18. The insulated electric conductor according to claim 16, wherein the at least one insulating layer is an extrusion coated layer on the oxide-layer-free exterior surface.

19. The insulated electric conductor according to claim 16, wherein the thermoplastic material is a polyaryletherketone [PAEK] selected from the group consisting of: polyetherketone [PEK], polyetheretherketone [PEEK], polyetherketoneketone [PEKK], polyetheretherketoneketone [PEEKK], polyetherketoneetherketoneketone [PEKEKK], and combinations thereof.

20. The insulated electric conductor according to claim 16, wherein the one or more electrically conductive materials include copper, aluminum, or a copper alloy.

21. The insulated electric conductor according to claim 16, wherein the at least one insulating layer adheres directly to the oxide-layer-free exterior surface as a result of application under a protective gas atmosphere.

22. The insulated electric conductor according to claim 16, wherein the insulated electric conductor is a winding wire for electrical machines.

* * * * *